(12) United States Patent
Casas et al.

(10) Patent No.: US 10,997,502 B1
(45) Date of Patent: *May 4, 2021

(54) COMPLEXITY OPTIMIZATION OF TRAINABLE NETWORKS

(71) Applicant: Cadence Design Systems, Inc., San Jose, CA (US)

(72) Inventors: Raúl Alejandro Casas, Doylestown, PA (US); Samer Lutfi Hijazi, San Jose, CA (US); Piyush Kaul, New Delhi (IN); Rishi Kumar, Jalandhar (IN); Xuehong Mao, San Jose, CA (US); Christopher Rowen, Santa Cruz, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 808 days.

This patent is subject to a terminal disclaimer.

(21) Appl. No.: 15/487,421

(22) Filed: Apr. 13, 2017

(51) Int. Cl.
  *G06N 3/08* (2006.01)
  *G06N 3/04* (2006.01)

(52) U.S. Cl.
  CPC .............. *G06N 3/082* (2013.01); *G06N 3/04* (2013.01)

(58) Field of Classification Search
  CPC .................................. G06N 3/082; G06N 3/04
  See application file for complete search history.

(56) References Cited

U.S. PATENT DOCUMENTS

| 10,871,536 | B2 | 12/2020 | Golden et al. |
| 2015/0006444 | A1 | 1/2015 | Tamatsu et al. |
| 2016/0358070 | A1* | 12/2016 | Brothers .............. G06N 3/0454 |
| 2017/0140273 | A1 | 5/2017 | Sagher et al. |
| 2017/0337472 | A1* | 11/2017 | Durdanovic ......... G06N 3/0454 |
| 2018/0096078 | A1* | 4/2018 | Leeman-Munk ..... G06T 11/206 |
| 2018/0107927 | A1* | 4/2018 | Frey ...................... G06N 3/084 |
| 2018/0129937 | A1 | 5/2018 | Bradbury et al. |
| 2018/0278527 | A1 | 9/2018 | Motoya Toru et al. |

OTHER PUBLICATIONS

Qiu et al., "Going Deeper with Embedded FPGA Platform for Convolutional Neural Network", Feb. 2016, FPGA '16: Proceedings of the 2016 ACM/SIGDA International Symposium on Field-Programmable Gate Arrays, pp. 26-35 (Year: 2016).*

Bengio, Y., et al., "Greedy Layer-Wise Training of Deep Networks", Advances in neural information processing systems, pp. 153-160, (2007), 8 pgs.

(Continued)

*Primary Examiner* — Kamran Afshar
*Assistant Examiner* — Brent Johnston Hoover
(74) *Attorney, Agent, or Firm* — Schwegman Lundberg & Woessner, P.A.

(57) ABSTRACT

Some embodiments perform, in a multi-layer neural network in a computing device, optimization of the multi-layer neural network, for example by making a convolutional change with a first plurality of convolutional filters, or by making a connection change of a first plurality of convolutional filters. In other embodiments, electronic design automation (EDA) systems, methods, and computer-readable media are presented for adding such a multi-layer neural network into an integrated circuit (IC) design.

20 Claims, 13 Drawing Sheets

(56) References Cited

OTHER PUBLICATIONS

Bengio, Yoshua, et al., "Practical Recommendations for Gradient-Based Training of Deep Architectures", arXiv preprint, arXiv:1206,5533v2, (Sep. 16, 2012), 33 pgs.

Bergstra, James, et al., "Algorithms for Hyper-Parameter Optimization", Advances in neural information processing systems, pp. 2546-2554, (2011), 9 pgs.

Bergstra, James, et al., "Making a Science of Model Search", arXiv preprint, arXiv:1209.5111v1, (Sep. 23, 2012), 11 pgs.

Bergstra, James, "Random Search for Hyper-Parameter Optimization", Journal of Machine Learning Research, vol. 13, (2012), 281-305.

Lin, Darryl D, et al., "Fixed Point Quantization of Deep Convolutional Networks", arXiv preprint, arXiv:1511.06393v3, (Jun. 2, 2016), 10 pgs.

U.S. Appl. No. 15/487,423, filed Apr. 13, 2017, Architectural Development of a Multi-Layer Neural Network.

Han, Song, et al., "Deep Compression: Compressing Deep Neural Networks with Pruning, Trained Quantization and Huffman Coding", arXiv preprint, arXiv:1510.00149v5, (Jan. 19, 2016), 14 pgs.

Han, Song, "EIE: Efficient Inference Engine on Compressed Deep Neural Networks", arXiv preprint,, arXiv:1602.01528v2, (May 3, 2016), 12 pgs.

Lan, Tian, et al., "Estimating Mutual Information Using Gaussian Mixture Model for Feature Ranking and Selection", International Joint Conference on Neural Networks, Vancouver, Canada, (Jul. 16-21, 2006), 6 pgs.

Liao, Zhibin, et al., "Competitive Multi-scale Convolution", arXiv preprint, arXiv:1511.05635v1, (Nov. 18, 2015), 9 pgs.

Monika, P, et al., "DI-ANN Clustering Algorithm for Pruning in MLP Neural Network", Indian Journal of Science and Technology, vol. 8(16), 62540, (Jul. 2015), 6 pgs.

Pietron, M, et al., "Leverahing Heterogenous Parallel Platform in Solving Hard Discrete Optimization Problems by Metaheuristics", elsevier preprint, Journal of Computational Science 18, (Jun. 6, 2016), 22 pgs.

Wang, Ruliang, et al., "Research and Application of Improved AGP Algorithm for Structural Optimization Based on Feedforward Neural Networks", Hindawi Publishing Corp., Mathematical Problems in Engineering, vol. 2015, Art. 481919, (2015), 7 pgs.

"U.S. Appl. No. 15/487,423, Non Final Office Action dated Dec. 26, 2019", 38 pgs.

"U.S. Appl. No. 15/487,423, Response filed Mar. 20, 2020 to Non Final Office Action dated Dec. 26, 2019", 11 pgs.

"U.S. Appl. No. 15/487,423, Final Office Action dated Apr. 6, 2020", 41 pgs.

"U.S. Appl. No. 15/487,423, Examiner Interview Summary dated May 21, 2020", 3 pgs.

"U.S. Appl. No. 15/487,423, Response filed Jun. 1, 2020 to Final Office Action dated Apr. 6, 2020", 13 pgs.

"U.S. Appl. No. 15/487,423, Advisory Action dated Jun. 18, 2020", 6 pgs.

"U.S. Appl. No. 15/487,423, Response filed Aug. 4, 2020 to Advisory Action dated Jun. 18, 2020", 13 pgs.

Chowell, G, "The Western Africa Ebola Virus Disease Epidemic Exhibits Both Global Exponential and Local Polynomial Growth Rates", PLoS Currents 7, (2015), 18 pgs.

He, Kaiming, "Convolutional Neural Networks at Constrained Time Cost", IEEE Computer Vision Foundation, Proceedings of the IEEE conference on computer vision and pattern recognition, (2015), 5353-5360.

Simonyan, Karen, "Very Deep Convolutional Networks for Large-Scale Image Recognition", ICLR 2015, arXiv:1409.1556v6, (Apr. 10, 2015), 14 pgs.

Vardhan, Vishnu R, "Estimation of Area under the ROC Curve Using Exponential and Weibull Distributions", Bonfring International Journal of Data Mining, vol. 2, No. 2, (Jun. 2012), 52-56.

U.S. Appl. No. 15/487,423, Non Final Office Action dated Sep. 17, 2020, 47 pgs.

"U.S. Appl. No. 15/487,423, Response filed Nov. 24, 2020 to Non Final Office Action dated Sep. 17, 2020", 12 pgs.

U.S. Appl. No. 15/487,423, Final Office Action dated Jan. 4, 2021, 52 pgs.

* cited by examiner

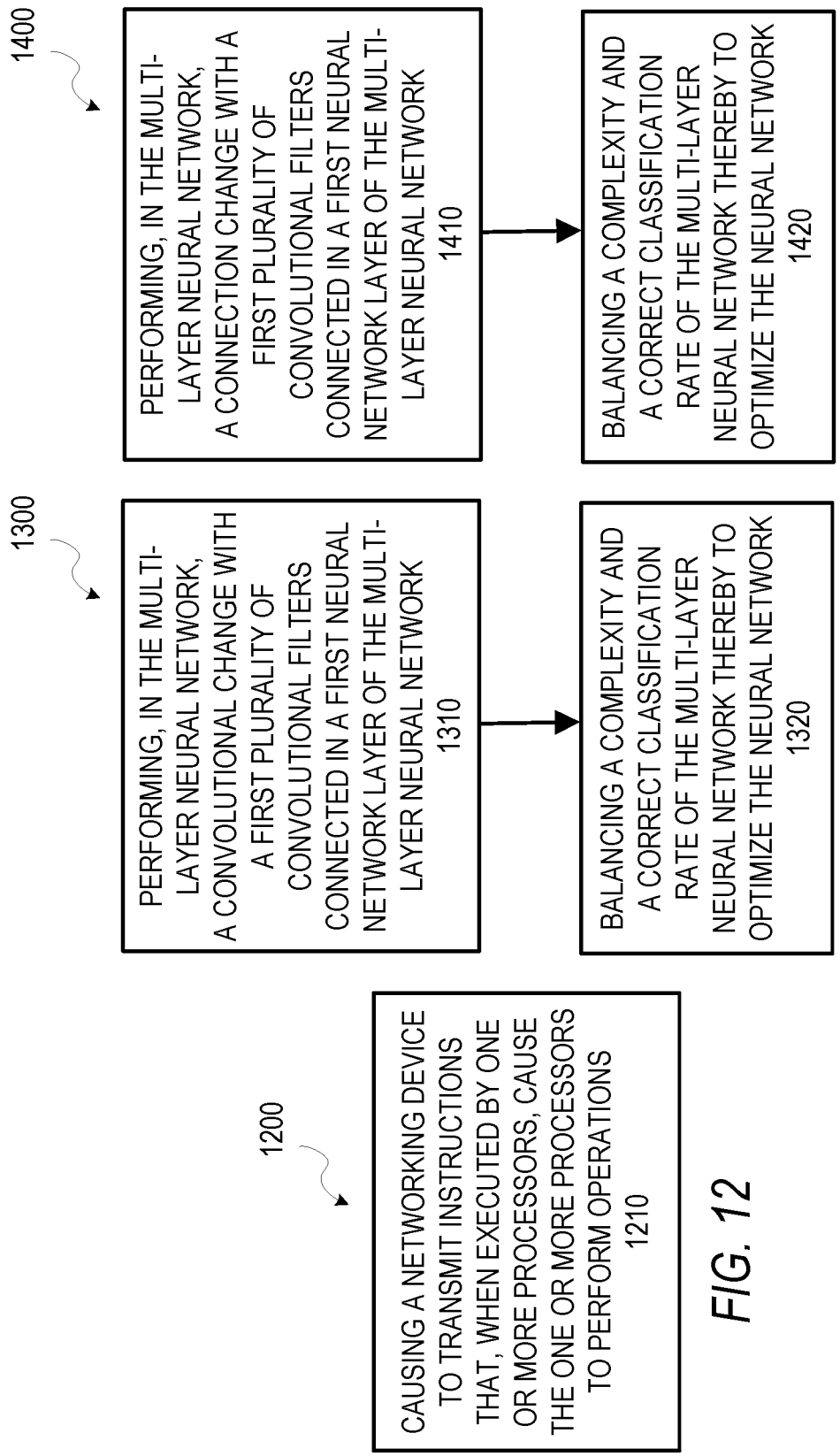

1500

PERFORMING, IN THE MULTI-LAYER NEURAL NETWORK IN A COMPUTING DEVICE, A FIRST CONVOLUTION OPERATION ON A FIRST PLURALITY OF INPUT FEATURE MAPS WITH A FIRST PLURALITY OF CONVOLUTIONAL FILTERS, THE FIRST PLURALITY OF CONVOLUTIONAL FILTERS INCLUDING A FIRST SET OF ONE OR MORE CONVOLUTIONAL FILTERS AND A SECOND SET OF ONE OR MORE CONVOLUTIONAL FILTERS, THE FIRST PLURALITY OF CONVOLUTIONAL FILTERS HAVING A PLURALITY OF FILTER PRECISIONS INCLUDING A FIRST FILTER PRECISION AND A SECOND FILTER PRECISION, THE SECOND FILTER PRECISION BEING LESS THAN THE FIRST FILTER PRECISION.

COMPLEXITY OPTIMIZATION OF TRAINABLE NETWORKS

TECHNICAL FIELD

Embodiments described herein relate to trainable networks such as neural networks.

BACKGROUND

Trainable networks are used for many different applications such as image classification. However, existing trainable networks that have sufficient detection or recognition performance have impractical data and filter storage requirements, memory access bandwidth requirements, and computational complexity.

Alternative approaches to trainable networks that have sufficient detection or recognition performance include pruning of network connections, quantization of coefficients, and optimization of bit precisions of data and filters. Example approaches exploit redundancy in convolutional filters to derive approximations that significantly reduce the required computation. However, such approaches have failed to reduce resource requirements such as computational complexity sufficiently.

BRIEF DESCRIPTION OF THE DRAWINGS

The drawings illustrate example embodiments of the present disclosure and do not limit the scope of the present disclosure.

FIG. 12 is an example method of transmitting instructions that cause a processor to perform operations.

FIGS. 13-15 are examples of operations performed by transmitted instructions.

DETAILED DESCRIPTION

Example embodiments described herein relate to methods, computer-readable media, cloud server systems, and devices used for neural networks that perform convolution. While certain example embodiments are discussed, it will be apparent that other embodiments not specifically described herein are attainable within the scope of the innovations presented herein. The following description and drawings illustrate specific embodiments to enable those skilled in the art to practice the example embodiments. Other embodiments incorporate specific structural, logical, electrical, process, and/or other changes. In further example embodiments, portions and/or features of some embodiments are included in, or substituted for, portions and/or features of other example embodiments. Elements of the example embodiments described herein cover all available equivalents of the described elements.

Some example embodiments perform, for example in a multi-layer neural network in a computing device, a convolution operation on input feature maps with multiple convolutional filters. The convolutional filters have a plurality of filter precisions including lower and higher filter precisions. In some example embodiments, along with at least one of the filter precisions being lower, the associated precisions of multiply operations and/or addition operations are also lower than if all filter precisions were high. Example circuitry that performs multiply operations and/or addition operations accordingly may occupy less chip area and consumes less power.

Figure 1:
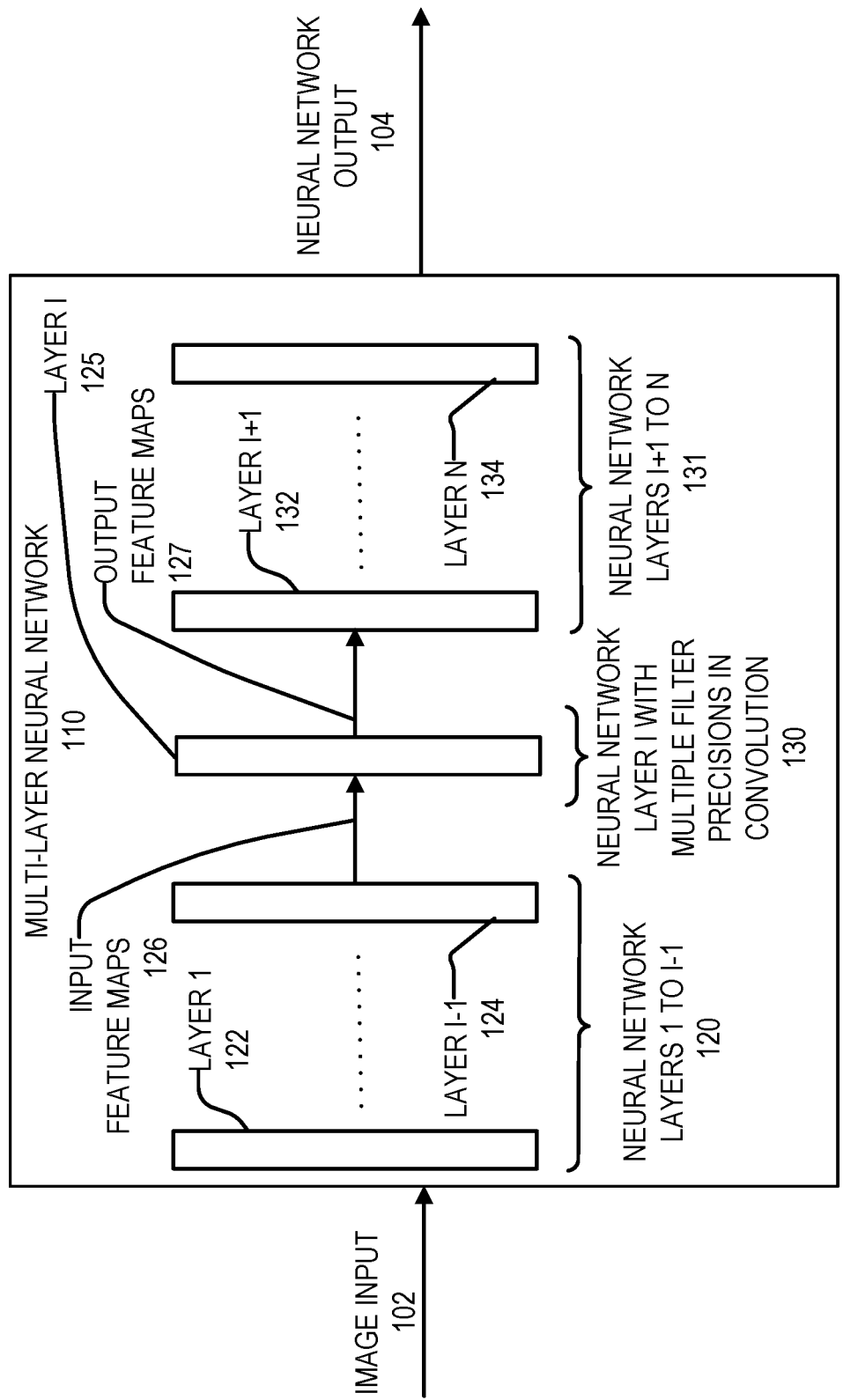
FIG. 1 is a block diagram of an example of a multi-layer neural network.

FIG. 1 is a block diagram of an example of a multi-layer neural network 110. The multi-layer neural network 110 receives input data, for example an image input 102, and provides a neural network output 104. Example multi-layer neural networks include feed-forward neural networks such as convolutional neural networks, recurrent neural networks that can include components such as convolutional neural networks, spiking neural networks, and support vector machines.

An example application of the multi-layer neural network 110 is in an embedded device that is deployed in, for example, a handheld device, a wearable device, a virtual reality device, or an environment with real-time requirements such as a car, or the like. In other example embodiments, the multi-layer neural network 110 receives as input a depth image formed by ranging signals such as radar or lidar. It should, however, be noted the methods and systems described herein may be deployed in a variety of different applications and is not limited to processing images.

The multi-layer neural network 110 is shown to include a plurality of neural network layers. More particularly, the multi-layer neural network 110 is shown to include a neural network layer 1 122 to a layer N 134. In an example embodiment, the layers 122 to 134 are arranged in groups including one or more layers. In the multi-layer neural network 110, the layer 1 122 to a layer I–1 124 are shown in a layer group 120; a layer I 125 is shown in a layer group 130; and a layer I+1 132 to a layer N 134 are shown in a layer group 131. The neural network layer I 125 has a plurality of filter precisions to perform filtering operations. In an example embodiment, each neural network layer performs a neural network function such as convolution, sub sampling, or the like. The layer 1 122 receives the example image input 102 and the layer N 134 is shown to provide the example neural network output 104. The layer I 125 receives the example input feature maps 126 from the layer I−1 124, and provides the example output feature maps 127 to the layer I+1 132.

Figure 2:
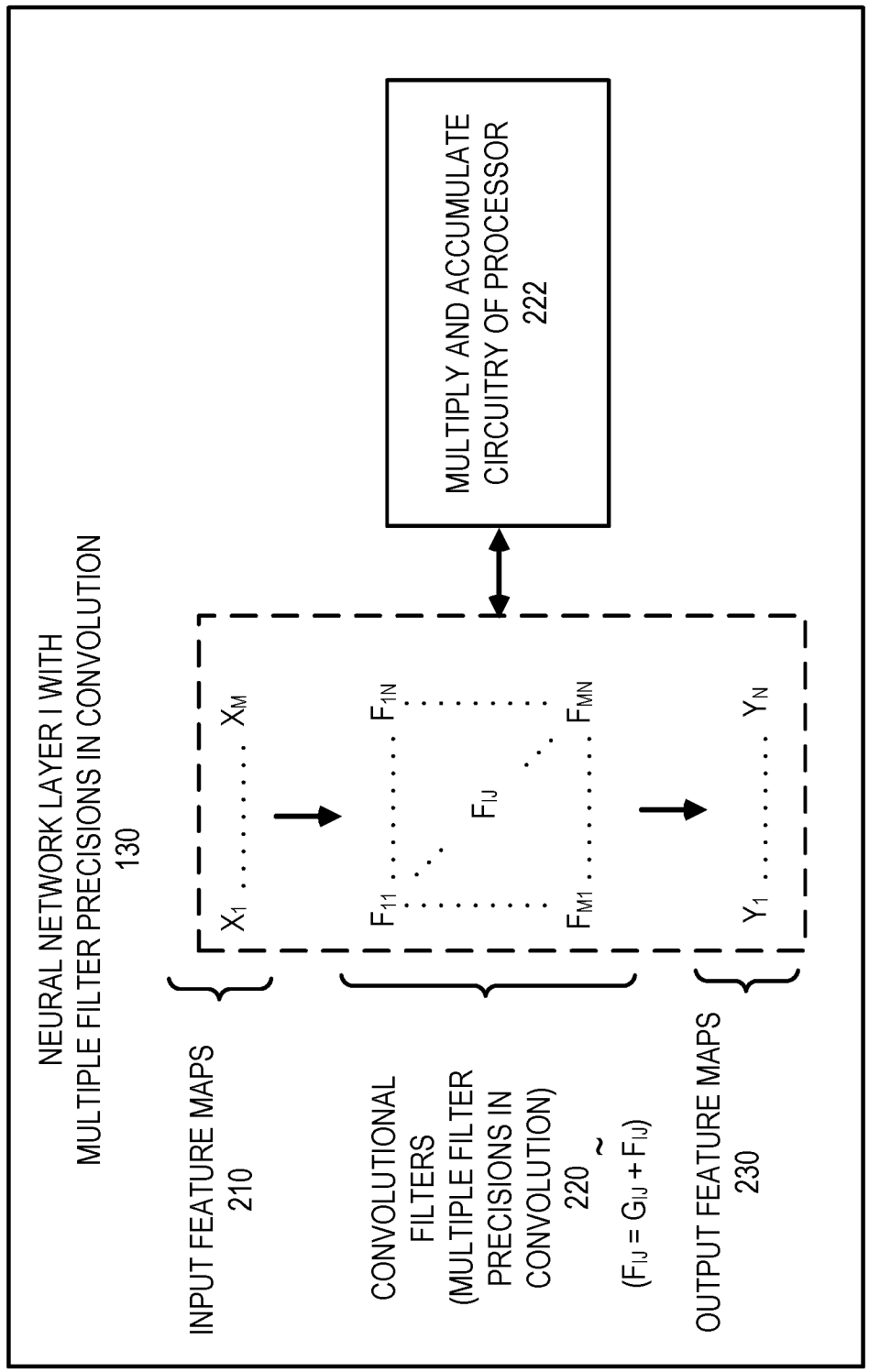
FIG. 2 is an example of a method of convolution with multiple precisions in a layer of the example multi-layer neural network of FIG. 1.

FIG. 2 is an example of a method to perform convolution operations with multiple precisions in a layer of a neural network, for example, the layer I 125 of the multi-layer neural network 110. In the example embodiment, the method is shown to occur in the neural network layer I 125 of FIG. 1 where filters within the layer I 125 have a plurality of different precisions to perform convolution on the input data. The input is input feature maps 210, shown as M feature maps from $X_1$ to $X_M$. The input feature maps 210 undergo convolution with convolutional filters 220. The convolutional filters 220 include filters with multiple precisions. In the shown example, an array of convolutional filters 220 from $F_{11}$ to $F_{MN}$ are used in the convolution operation. The convolutional filters 220 from $F_{11}$ to $F_{MN}$ are sums of convolutional basis filters $G_{11}$ to $G_{MN}$ and convolutional residual filters $\widetilde{F_{11}}$ to $\widetilde{F_{MN}}$. The output is output feature maps 230, shown as N feature maps from $Y_1$ to $Y_N$. To form output feature map $Y_1$, respective convolutional filters $F_{11}$ to $F_{M1}$ are used in convolutions with respective input feature maps from $X_1$ to $X_M$. In a convolution of a convolutional filter and an input feature map, the convolutional filter is a sliding window matrix that overlies part of the input feature map. The values of the sliding window matrix and the underlying input feature map are termwise multiplied and added to result in one element of the output feature map. The sliding window matrix is slid over the underlying input feature map and the process repeated until one convolution is complete. The resulting M convolutions are summed. Similarly, to form output feature map $Y_J$, respective convolutional filters $F_{1J}$ to $F_{MJ}$ are used in convolutions with respective input feature maps from $X_1$ to $X_M$, and the resulting M convolutions are summed.

In one example, the convolutions are performed with the multiply and accumulate circuitry of a processor 222. The processor may be a digital signal processor, general processor, or other processor.

Figure 3:
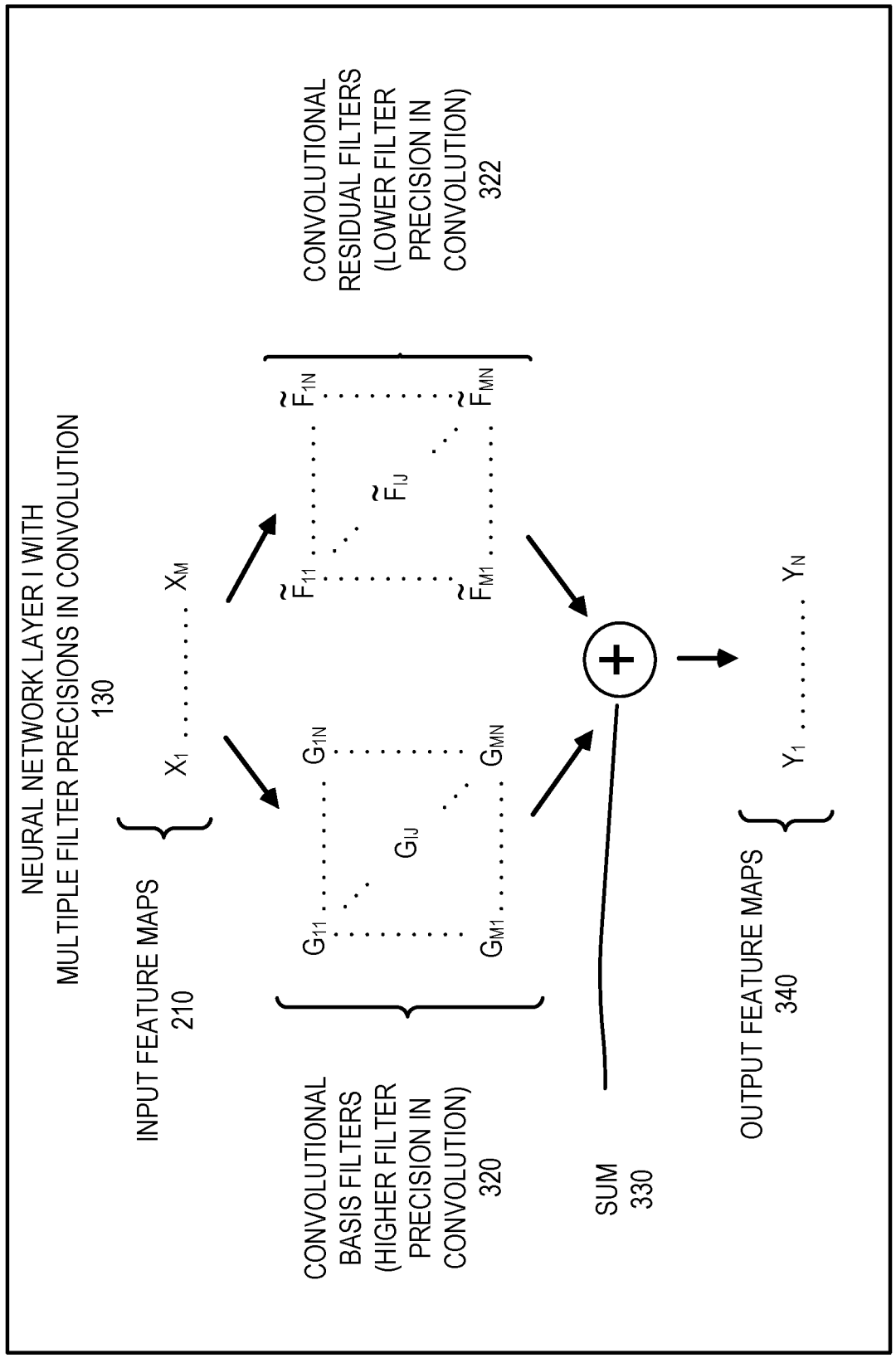
FIG. 3 is an example of a more detailed method of convolution with multiple precisions in a layer of the example multi-layer neural network of FIG. 1.

FIG. 3 is an example of a more detailed method of convolution with multiple precisions in a layer of the multi-layer neural network 110. FIG. 3 is similar to FIG. 2 except FIG. 3 makes more explicit the separation of convolutional filters into different sets of convolutional filters having different filter precisions. In particular, the convolutional filters 220 of FIG. 2 from $F_{11}$ to $F_{MN}$ are separated into a set of convolutional basis filters 320 $G_{11}$ to $G_{MN}$ having higher precision and a set of convolutional residual filters 322 $\widetilde{F_{11}}$ to $\widetilde{F_{MN}}$ having lower precision. The convolutional filters 220 from $F_{11}$ to $F_{MN}$ equal the sum of the set of convolutional basis filters 320 $G_{11}$ to $G_{MN}$ having higher precision and the set of convolutional residual filters 322 $\widetilde{F_{11}}$ to $\widetilde{F_{MN}}$, on a filter-by-filter basis, such that $F_{IJ} = G_{IJ} + \widetilde{F_{IJ}}$. Each sum of filters is a sum of matrices.

Convolutions are performed with input feature maps 210 and a set of convolutional basis filters 320 $G_{11}$ to $G_{MN}$ having higher precision, and with input feature maps 210 and a set of convolutional residual filters 322 $\widetilde{F_{MN}}$ 900 to $\widetilde{F_{MN}}$ having lower precision. Then the output feature maps of the convolutions with a plurality of different filter precisions undergo a sum 330, resulting in output feature maps 340.

To form output feature map $Y_1$, a sum 330 is performed by adding the results of first and second convolutions. The first convolution uses the set of convolutional basis filters 320 $G_{11}$ to $G_{M1}$ having higher precision with respective input feature maps from $X_1$ to $X_M$. The convolutional basis filter 320 is a sliding window matrix, as in the previously described convolution process. The resulting M convolution outputs are summed.

The second convolution uses the set of convolutional residual filters 322 $\widetilde{F_{11}}$ to $\widetilde{F_{M1}}$ having lower precision with respective input feature maps from $X_1$ to $X_M$. The convolutional residual filter is a sliding window matrix that overlies part of the input feature map. The convolutional basis filter is a sliding window matrix, as in the previously described convolution process. The resulting M convolutions are summed. Results of the first convolution with the set of convolutional basis filters and the second convolution with the set of convolutional residual filters are summed in the convolution sum 330 to form output feature map $Y_1$.

Forming output feature map $Y_J$ is similar to forming output feature map $Y_1$, except that respective convolutional basis filters $G_{1J}$ to $G_{MJ}$ are used in convolutions with respective input feature maps from $X_1$ to $X_M$, and respective convolutional residual filters $\widetilde{F_{1J}}$ to $\widetilde{F_{MJ}}$ are used in convolutions with respective input feature maps from $X_1$ to $X_M$. The basis filters G are formed by clustering the N columns of F into L clusters. By mapping each of the N columns of G to one of L<=N centroids, only L unique column operations are needed to compute the convolution between G and X. As a result, only M×L operations are performed at a higher precision to generate the contribution from G to the output feature maps Y. Additionally, M×N operations are performed at a lower precision to generate the contribution from the residual filters $\widetilde{F}$ to the output feature maps Y. With appropriate selection of the number of clusters L and the precisions applied to the operations from G and $\widetilde{F}$, quantization error and complexity are traded off, thereby achieving significant savings in complexity at limited degradation in performance.

In one embodiment, the first convolution uses 8-bit data and 8-bit coefficients in the convolutional filters. Given that the computational complexity of an 8-bit-by-8-bit multiply accumulate (MAC) is twice the complexity of an 8-bit-by-4-bit MAC, the reduction in complexity is:

$$\text{Reduction [8 bit} \times \text{8 bit } MACs]: \left(\frac{N}{2} - L\right) M K^2 P^2$$

where K is the spatial dimension of the K×K convolutional filters being quantized, $P^2$ is the number of pixels in each output P×P feature map, M is the number of input feature maps, L is the number of cluster filters, and N is the number of output feature maps. As can be seen in this example, a reduction in computational complexity is possible if the number of cluster filters L is sufficiently low (e.g., L<N/2) and if the residual filters $\widetilde{F}$ can be represented in lower precision without a significant impact to accuracy.

Figure 4:
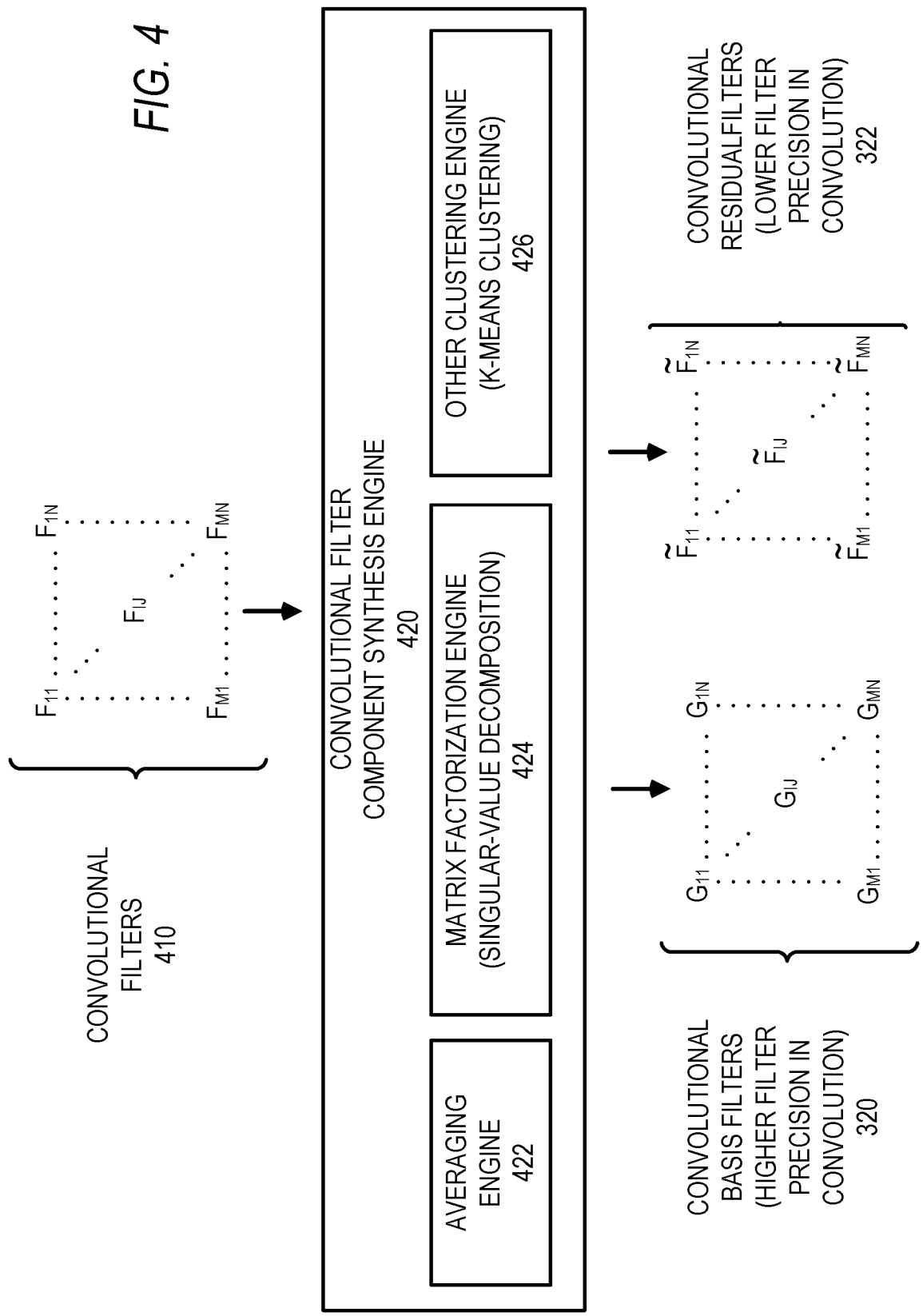
FIG. 4 is an example method of making convolutional filters with multiple precisions.

FIG. 4 is an example of a method of making convolutional filters with multiple precisions. The input is convolutional filters 410 from $F_{11}$ to $F_{MN}$ which may have a single precision or multiple precisions. A convolutional filter component synthesis engine 420 separates the convolutional filters 410 into a set of convolutional basis filters 320 $G_{11}$ to $G_{MN}$ having higher precision and a set of convolutional residual filters 322 $\widetilde{F_{11}}$ to $\widetilde{F_{MN}}$ having lower precision. The convolutional filters 410 from $F_{11}$ to $F_{MN}$ are well approximated by the sum of the set of convolutional basis filters 320 $G_{11}$ to $G_{MN}$ having higher precision and the set of convolutional residual filters 322 $\widetilde{F_{11}}$ to $\widetilde{F_{MN}}$ having lower precision, on a filter-by-filter basis, such that $F_{IJ} \approx G_{IJ} + \widetilde{F_{IJ}}$. Each sum of filters is a sum of matrices. The convolutional filter component synthesis engine 420 has one or more of the following engines: an averaging engine 422, a matrix factorization engine 424, which performs algorithms such as singular-value decomposition, and another clustering engine 426, which performs algorithms such as K-means clustering.

Some embodiments were used in experiments with a German Traffic Sign Recognition Benchmark (GTSRB), comparing performance of a homogenous quantization approach with 8-bit data and 8-bit coefficients against hybrid quantization where convolutional basis filters were selected as the centroids of a K-means clustering applied to three-dimensional convolutional filters of each layer. K-means cluster convolutional basis filters were implemented with 8-bit coefficients, and residual convolutional filters with 4 bits. The cluster convolutional basis filters were applied to 8-bit data. The residual convolutional filters were applied to 8-bit data in one experiment and 4-bit data in a second experiment. The results are summarized in the table below, which shows an improvement of up to 41% in computational complexity with no degradation in recognition performance for 8-bit input data. For 4-bit input data, the complexity is reduced by 62% with a small decrease in recognition performance.

| # Cluster/ Basis Filters | Correct Recognition Rate [%] | Complexity Reduction [%] |
| --- | --- | --- |
| Baseline (homogenous quantization) | 99.427 | 0 |
| 8 bit data (hybrid quantization) | 99.435 | 41% |
| 4 bit data (hybrid quantization) | 99.379 | 62% |

Figure 5:
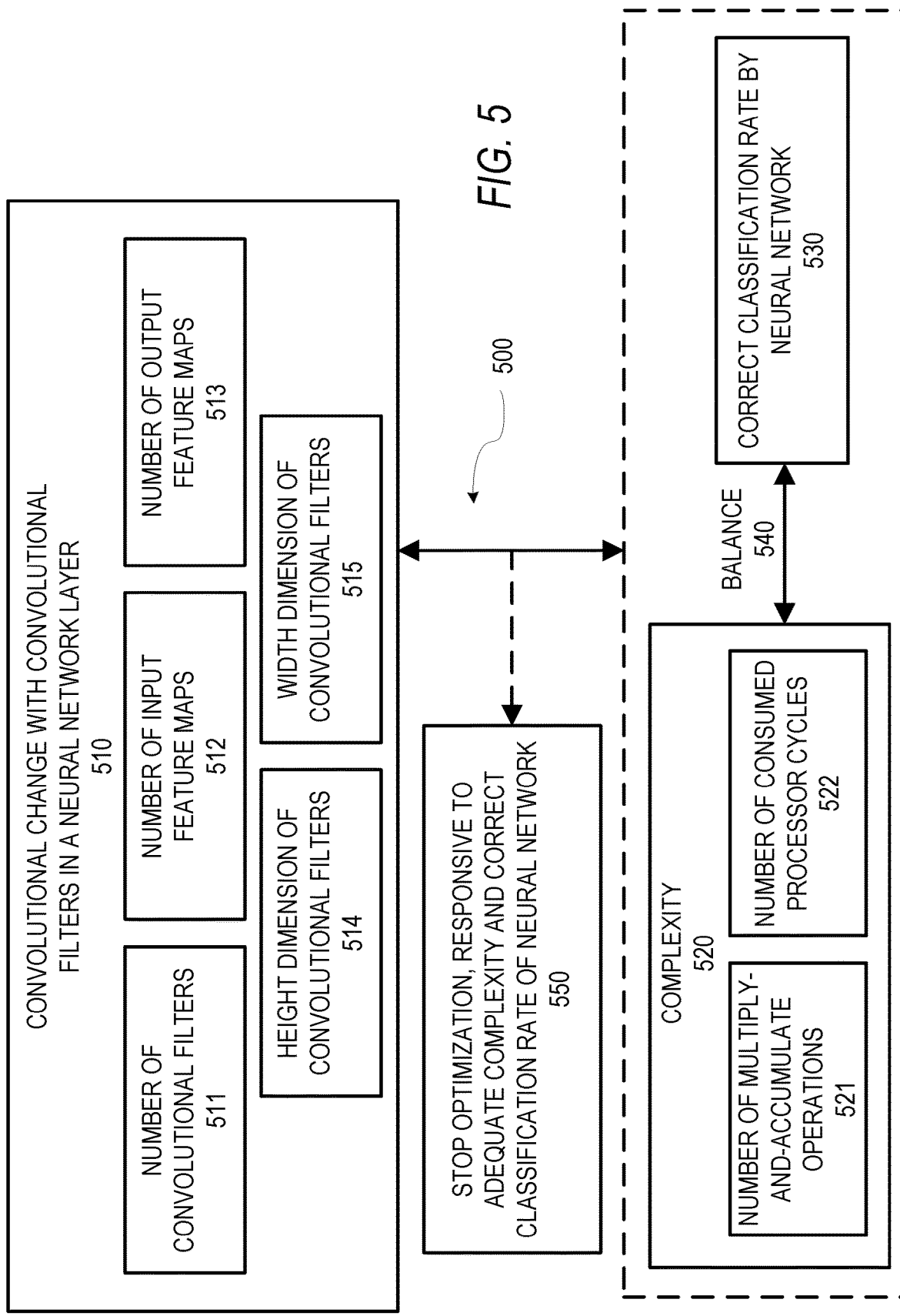
FIG. 5 is an example method of optimizing a multi-layer neural network by making a convolutional change with a plurality of convolutional filters.

FIG. 5 is an example of a method of optimizing a multi-layer neural network by making a convolutional change with a plurality of convolutional filters. The optimization process of the method 500 minimizes or reduces complexity while maintaining a minimum correct classification rate by performing convolutional changes. More particularly, the method 500 is shown to include a convolutional change with convolutional filters in a neural network layer 510 and a balance 540 between a complexity 520 and a correct classification rate by the neural network 530. In an example embodiment, the convolutional change with convolutional filters in a neural network layer 510 has one or more examples such as a number of convolutional filters 511, and a change in filter parameters such as a number of input feature maps 512, a number of output feature maps 513, a height dimension of convolutional filters 514, and a width dimension of convolutional filters 515. Such convolutional changes with convolutional filters in a neural network layer occur in FIG. 3, for example. In an example embodiment, the complexity 520 has one or more examples such as a number of multiply-accumulate operations 521 and a number of processor cycles 522.

In the example method 500, one or more convolutional changes with convolutional filters are performed in a neural network layer 510. In view of the one or more changes, the balance 540 is determined between the complexity 520 and the correct classification rate by the neural network 530. In an example of a convolutional change with convolutional filters in a neural network layer 510 that increases complexity, the correct classification rate by the neural network 530 increases. In another example of a convolutional change with convolutional filters in a neural network layer 510 that decreases complexity, the correct classification rate by the neural network 530 decreases.

In the example method 500, the complexity 520 is increased until the correct classification rate by the neural network 530 is adequate. However, the complexity 520 may be decreased until the correct classification rate by the neural network 530, which was already adequate, is decreased and yet remains adequate. Further, the complexity 520 may be both increased and decreased with a resulting net increase or net decrease in the correct classification rate by the neural network 530. At operation 550, optimization stops, responsive to adequate complexity and correct classification rate of the neural network.

Figure 6:
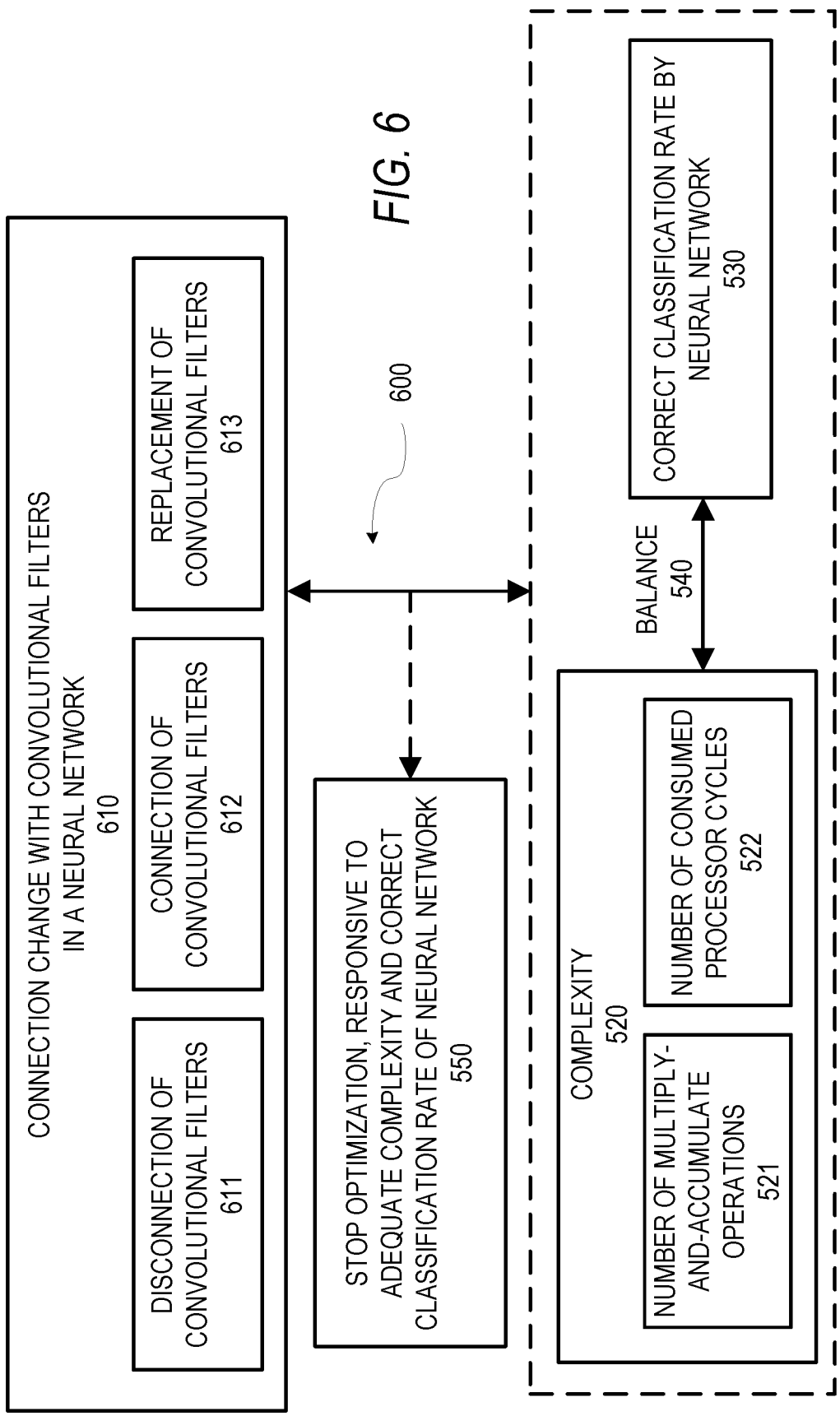
FIG. 6 is an example method of optimizing a multi-layer neural network by making a connection change of a plurality of convolutional filters.

FIG. 6 is an example method 600 of optimizing a multi-layer neural network by making a connection change of a plurality of convolutional filters. More particularly, the method 600 is shown to include a connection change with convolutional filters in a neural network 610 and the balance 540 between the complexity 520 and a correct classification rate by the neural network 530. In an example embodiment, the connection change of convolutional filters in a neural network layer 610 has one or more examples, such as a disconnection of convolutional filters 611, a connection of convolutional filters 612, and a replacement of convolutional filters 613.

In the method 600, one or more connection changes of convolutional filters are performed in the neural network 610. In view of the one or more changes, the balance 540 is determined between the complexity 520 and the correct classification rate by the neural network 530. In other respects, the method 600 may be similar to the method 500 of FIG. 5.

Figure 7:
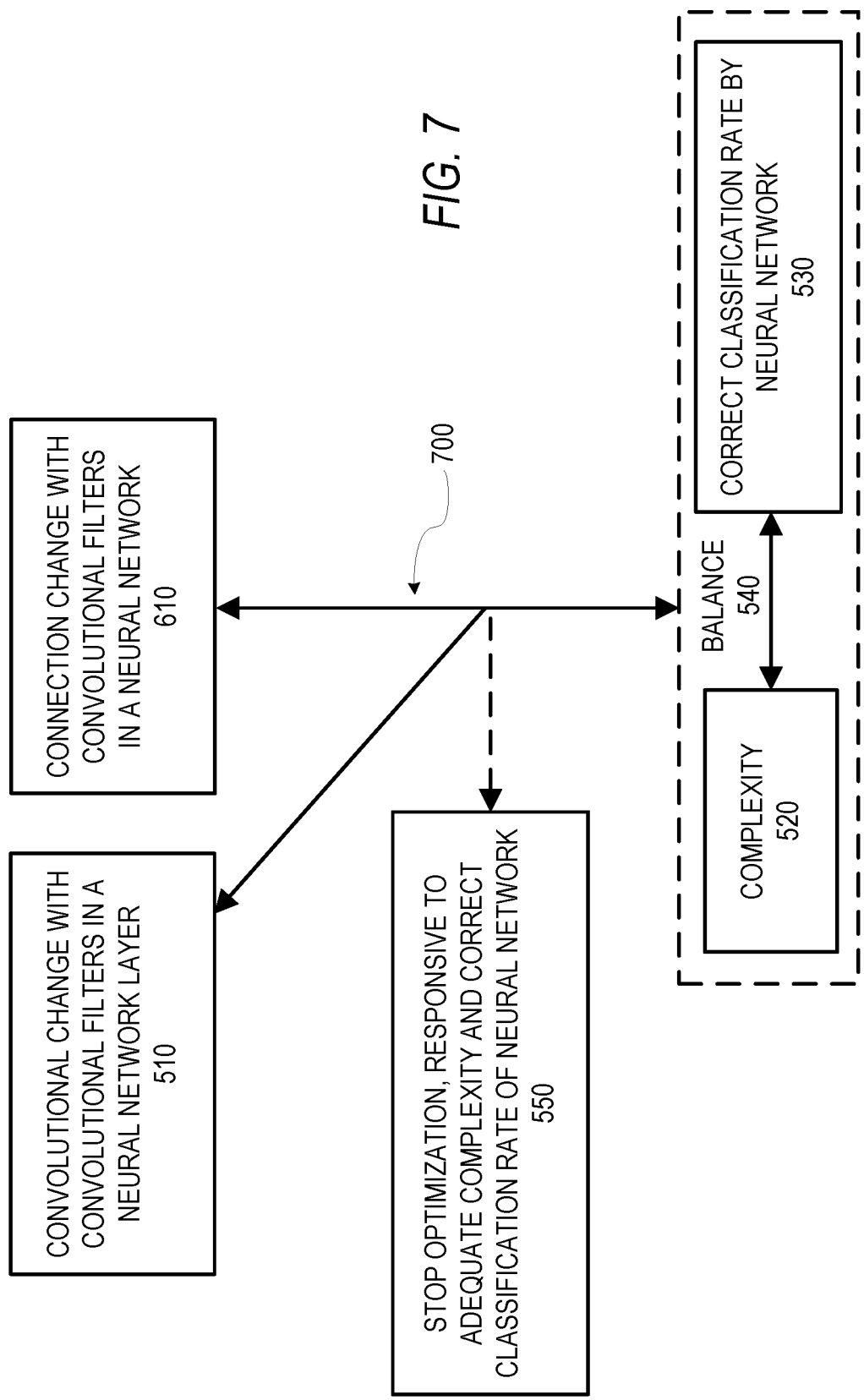
FIG. 7 is an example method of optimizing a multi-layer neural network by making a convolutional change with a plurality of convolutional filters, and making a connection change of a plurality of convolutional filters.

FIG. 7 is an example method of optimizing a multi-layer neural network by performing a convolutional change with a plurality of convolutional filters, and performing a connection change of a plurality of convolutional filters. More particularly, the method 700 is shown to include a convolutional change with convolutional filters in the neural network layer 510, a connection change of convolutional filters in a neural network 610, and the balance 540 between a complexity 520 and the correct classification rate by the neural network 530.

In certain circumstances, one or more convolutional changes of convolutional filters are performed in the neural network layer 510, and one or more connection changes of convolutional filters are performed in the neural network 610. In view of the changes, the balance 540 is determined between the complexity 520 and the correct classification rate by the neural network 530. In other respects, the method 700 is similar to the method 500 of FIG. 5 and the method 600 of FIG. 6.

Figure 8:
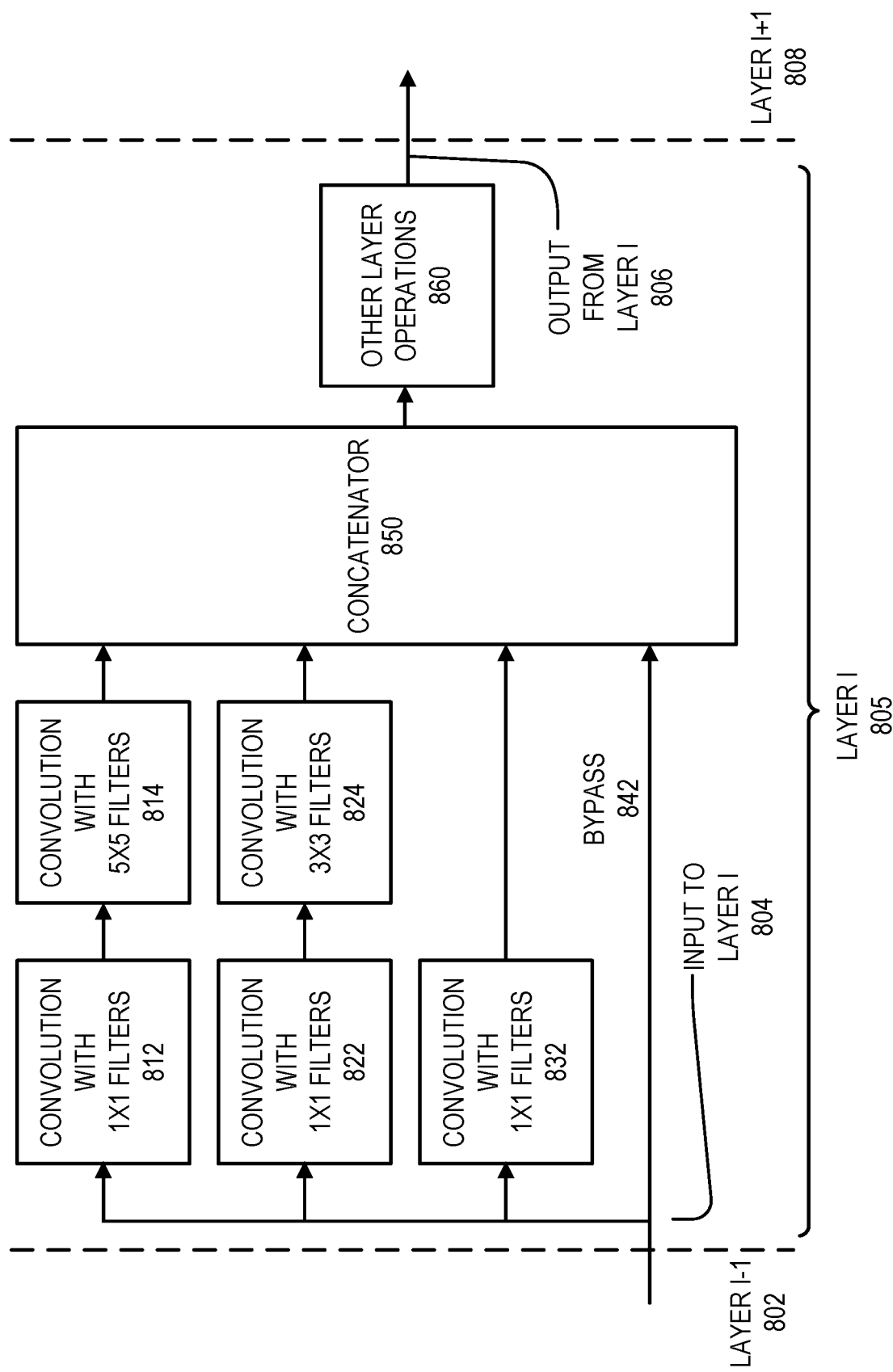
FIG. 8 is a block diagram of an example of a multi-layer neural network with examples of connection changes of convolutional filters.

FIG. 8 is a block diagram of an example of a multi-layer neural network with examples of connection changes of convolutional filters. More particularly, the multi-layer neural network includes a neural network layer I−1 802, a neural network layer I 805, and a neural network layer I+1 808. An input to layer I 804 is communicated from neural network layer I−1 802 to a neural network layer I 805. An output from layer I 806 is communicated from the neural network layer I 805 to a neural network layer I+1 808.

Various example embodiments are implemented by connection changes in between, for example, the input to layer I 804 and a concatenator 850. One example embodiment connects, in series, a network path with a convolution with 1×1 filters 812 and a convolution with 5×5 filters 814. Another example embodiment connects a network path with, in series, a convolution with 1×1 filters 822 and a convolution with 3×3 filters 824. Another example embodiment connects a network path with a convolution with 1×1 filters 832. Another example embodiment connects a network path with a bypass 842. Another example embodiment includes parallel network paths of connections of convolutions. It is to be appreciated that various combinations of filters of varying dimensions may be used in the example embodiments. Further, although the layer I 805 is shown to include three parallel paths and a single bypass 842, other example embodiments may include more, or less, parallel paths. Different parallel path may include filters of varying dimensions.

In an example embodiment, a connection change to process data in the multi-layer neural network includes a connection of a convolution. In another example embodiment, a connection change to not process data in the multi-layer neural network includes a disconnection of a convolution. For example, in the case that a convolution does not connect the input to layer I 804 and a concatenator 850, then in one example embodiment a bypass 842 connects the input to layer I 804 and the concatenator 850. In another example embodiment, the connection change is a replacement of convolutional filters that includes disconnection of a first convolution and connection of a second convolution.

In the example embodiment shown in FIG. 8, the concatenator 850 combines two or more of the parallel connections, such as convolutions or the bypass 842. The output feature maps of the concatenator 850 are provided to other layer operations 860. Some example embodiments of the other layer operations 860 include one or more of convolution, pooling, rectified linear units, sub sampling, and a fully connected layer.

In FIGS. 5-7, one example embodiment measures complexity as a number of multiply-and-accumulate operations (MACs). In an example embodiment, a convolutional neural network (CNN) has neural network layers 1, 2, 3, etc., with respective convolutional filter output dimensions, or equivalently a number of output feature maps such as $N_1$, $N_2$, $N_3$, etc., that are generated by each neural network layer. In an example embodiment, the total number of MACs is expressed as a function of a vector formed by the number of outputs from each layer, such as $x=[N_1\ N_2\ N_3\ \ldots]$. In one example embodiment, the complexity, expressed as a number of MACs, is defined by a quadratic form:

$$MAC(x) = x^t Q\, x + f^t x + C$$

Q, f and C are constants derived from calculating the number of MACs over an entire convolutional network. If $x=[N_1\ N_2\ N_3\ \ldots]$ has L dimensions then Q is an L×L matrix. The elements of Q count the complexity of connected layers. For example, if layer J's output goes into layer K, and layer J has $N_J$ output feature maps while layer K has $N_K$ output feature maps, then $Q_{JK}=Q_{KJ}=q/2$ for some constant q indicates that layer K performs $q\ N_J\ N_K$ MAC calculations. Vector f is an L×1 vector that counts the MACs related to the bias terms in a convolutional network and C are constant calculations that do not depend on the parameters in x being optimized.

In FIGS. 5-7, one example embodiment measures a correct classification rate (CCR) of the neural network. In one example embodiment, CCR data are collected with a matrix factorization approach. An orthonormal basis is computed for a matrix constructed from the coefficients of the convolutional filters in a layer of a CNN. Variations in the number of basis vectors utilized to reconstruct this matrix correspond to variations in the output dimensions for that layer via a linear transformation. With this approach, changes in the CCR are measured for a variety of dimensions of each neural network layer. A nonlinear multi-dimensional function of these output dimension perturbations is fitted to the CCR data-points. In an example embodiment, the CCR curve is modeled as an exponential of an n-th order multivariate polynomial:

$$CCR(x) = \rho - \exp\left(-\sum_{\substack{e_i \cdot 1 < n \\ [e_i]_k \geq 0}} \alpha_{e_i}\, x^{e_i}\right),$$

where $x=[N_1\ N_2\ N_3]^t$, $e_1=[0\ 2\ 1]^t$, and $x^{e_1}=N_1^0\ N_2^2\ N_3^1$, such that $[e_i]_k \geq 0$ indicates that all elements of the exponential are non-negative. The coefficients $\alpha_{e_i}$ are experimentally obtained during the fitting process.

Figure 9:
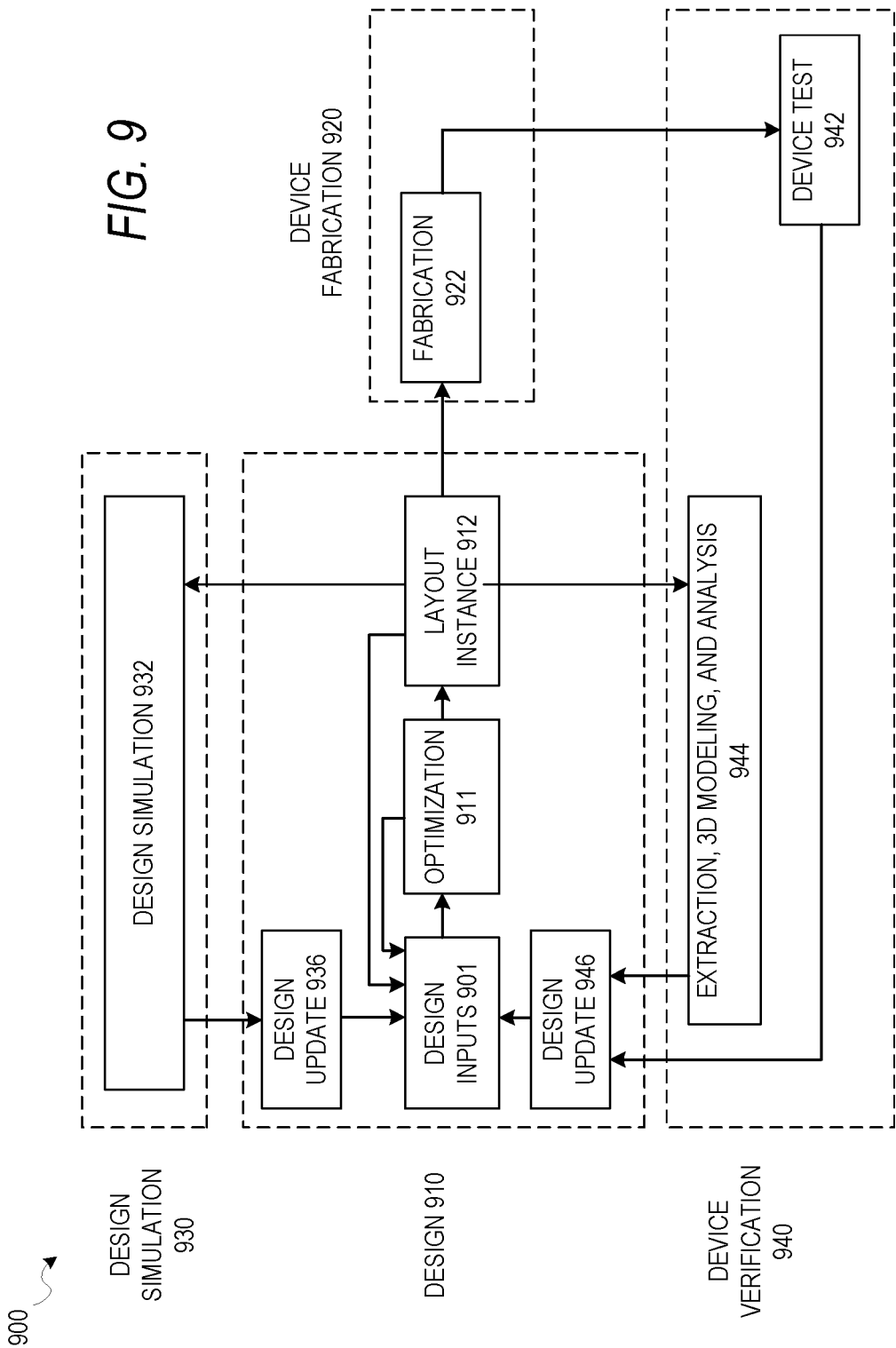
FIG. 9 is a diagram illustrating an example design method for hybrid precision filtering in a machine learning system, according to some example embodiments.

FIG. 9 is a diagram illustrating one possible design method of network optimization in a machine learning system, according to some example embodiments. As illustrated, the overall design flow 900 includes a design phase 910, a device fabrication phase 920, a design simulation phase 930, and a device verification phase 940. The design phase 910 involves an initial design inputs operation 901 where the basic elements and functionality of a device are determined, as well as revisions based on various analyses and optimization of a circuit design. This design input operation 901 is where instances of an electronic design automation (EDA) circuit design file are used in the design and any additional circuitry is selected. The initial strategy, tactics, and context for the device to be created are also generated in the design input operation 901, depending on the particular design algorithm to be used.

In some embodiments, the design phase 910 includes creation and/or access of network optimization in a machine learning system.

After design inputs are used in the design input operation 901 to generate a circuit layout, and any optimization operations 911 are performed, a layout is generated in a layout instance 912. The layout describes the physical layout dimensions of the device that match the design inputs. This layout may then be used in a device fabrication operation 922 to generate a device, or additional testing and design updates may be performed using designer inputs or automated updates based on design simulation 932 operations, and extraction, three-dimensional (3D) modeling, and analysis 944 operations.

Once the device is generated, the device can be tested as part of device test 942 operations and layout modifications generated based on actual device performance.

Design updates 936 from the design simulation 932, design updates 946 from the device test 942 and extraction, 3D modeling, and analysis 944 operations, or the design inputs operation 901 may occur after the initial layout instance 912 is generated. In various embodiments, whenever design inputs are used to update or change an aspect of a circuit design, a timing analysis and optimization operation 911 may be performed.

Figure 10:
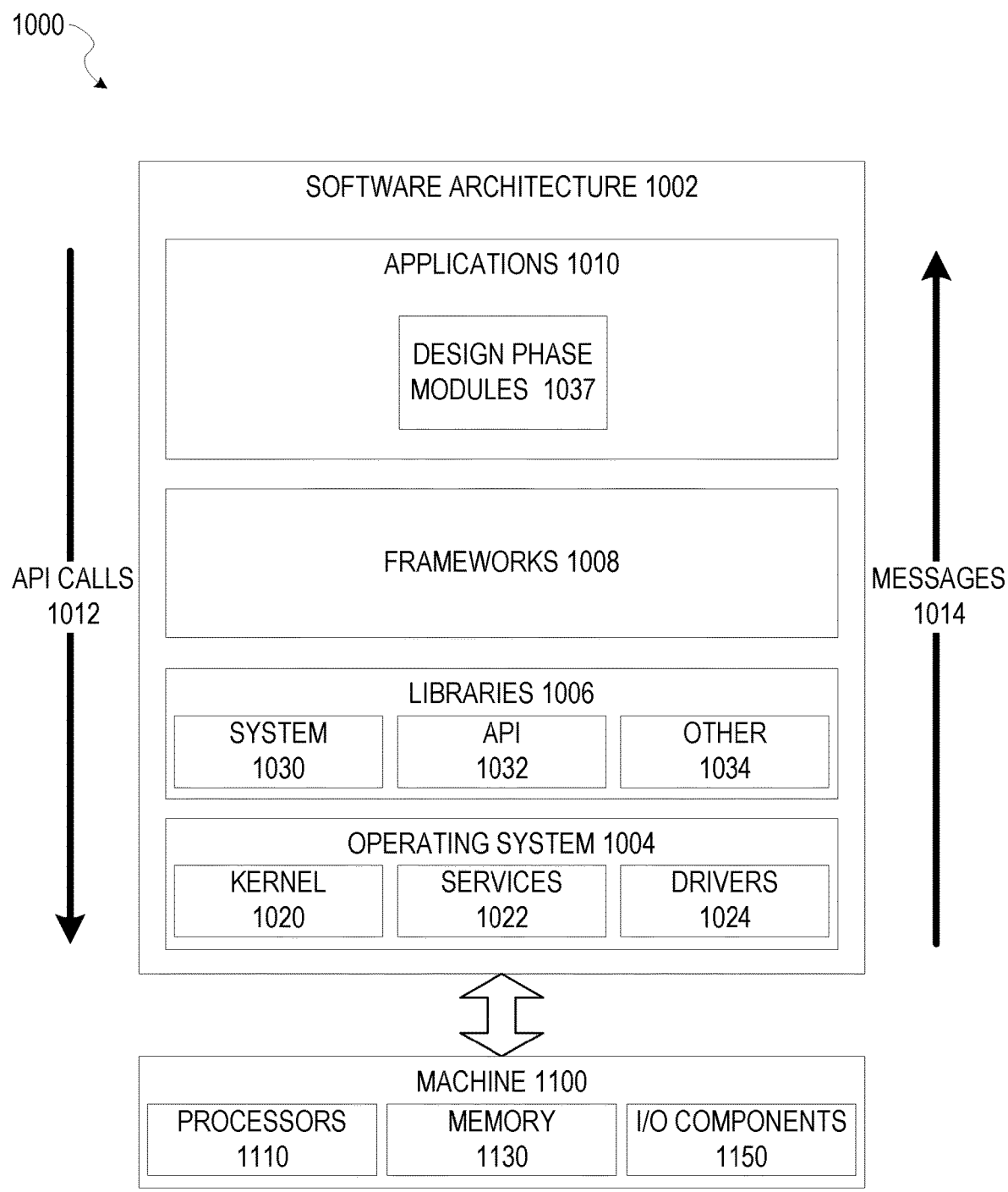
FIG. 10 is a block diagram illustrating an example of a software architecture that may be used according to some example embodiments.

FIG. 10 is a block diagram 1000 illustrating an example of a software architecture 1002 operating on an EDA computer and used to add logic to implement any of the embodiments described herein, such as convolution with multiple precisions in a layer, optimization to include connection changes of convolutional filters in a neural network, and optimization to include convolutional changes.

FIG. 10 is merely a non-limiting example of a software architecture 1002, and it will be appreciated that many other architectures can be implemented to facilitate the functionality described herein. In various embodiments, the software architecture 1002 is implemented by hardware such as a machine 1100 that includes processors 1110, memory 1130, and input/output (I/O) components 1150. In this example, the software architecture 1002 can be conceptualized as a stack of layers where each layer may provide a particular functionality. For example, the software architecture 1002 includes layers such as an operating system 1004, libraries 1006, software frameworks 1008, and applications 1010. Operationally, the applications 1010 invoke application programming interface (API) calls 1012 through the software stack and receive messages 1014 in response to the API calls 1012, consistent with some embodiments. In various embodiments, any client device, server computer of a server system, or any other device described herein may operate using elements of the software architecture 1002. An EDA computing device described herein may additionally be implemented using aspects of the software architecture 1002, with the software architecture 1002 adapted for adding network optimization in a machine learning system.

In one embodiment, an EDA application of the applications 1010 adds network optimization in a machine learning system according to embodiments described herein using various modules such as design phase modules 1037 within the software architecture 1002. For example, in one embodiment, an EDA computing device similar to the machine 1100 includes memory 1130 and one or more processors 1110. The processors 1110 implement the design phase 910 to add convolution with multiple precisions in a layer, optimization to include connection changes of convolutional filters in a neural network, and optimization to include convolutional changes in a machine learning system.

In various other embodiments, rather than being implemented as modules of one or more applications 1010, some or all of the design phase modules 1037 may be implemented using elements of the libraries 1006 or the operating system 1004.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 such as libraries of analog, digital, and power-management blocks for use in an EDA environment or other libraries that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and 3D graphic content on a display), database libraries (e.g., SQLite to provide various relational database functions), web libraries (e.g., WebKit to provide web browsing functionality), and the like. The libraries 1006 may also include other libraries 1034.

The software frameworks 1008 provide a high-level common infrastructure that can be utilized by the applications 1010, according to some embodiments. For example, the software frameworks 1008 provide various graphic user interface (GUI) functions, high-level resource management, high-level location services, and so forth. The software frameworks 1008 can provide a broad spectrum of other APIs that can be utilized by the applications 1010, some of which may be specific to a particular operating system or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, Synopsys Design Constraint (SDC) files, and viewdefinition files are examples that may operate within the software architecture 1002, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1100 including processors 1110), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1100, but deployed across a number of machines 1100. In some example embodiments, the processors 1110 or processor-implemented modules are located in a single geographic location (e.g., within a home environment, an office environment, or a server farm). In other example embodiments, the processors 1110 or processor-implemented modules are distributed across a number of geographic locations.

Figure 11:
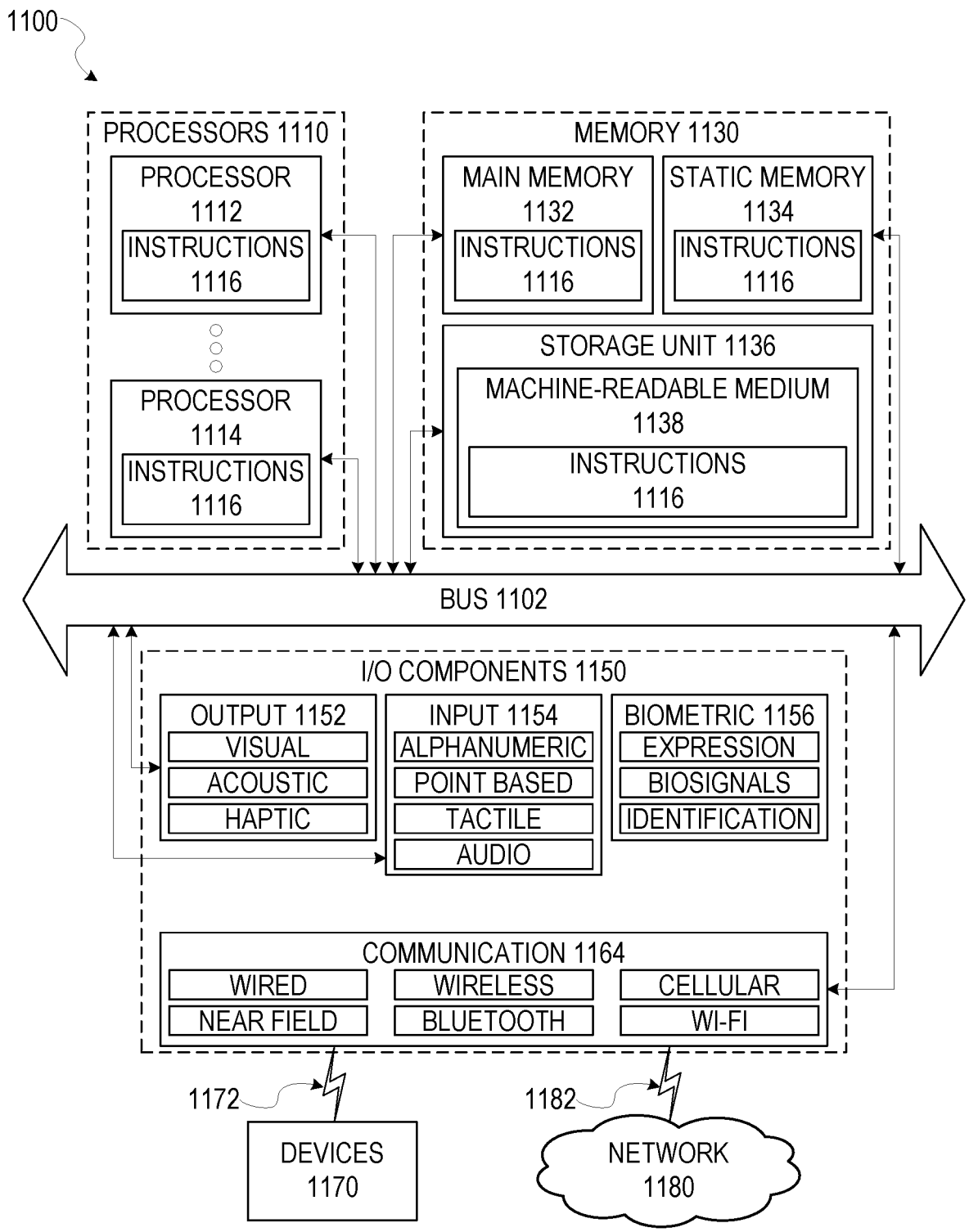
FIG. 11 is a diagrammatic representation of a machine in the form of a computer system within which a set of instructions are executable to perform the methodologies described herein.

FIG. 11 is a diagrammatic representation of a machine 1100 in the form of a computer system within which a set of instructions 1116 are executable, causing the machine 1100 to add network optimization in a machine learning system, according to some example embodiments discussed herein. FIG. 11 shows components of the machine 1100, which is, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) causing the machine 1100 to perform any one or more of the methodologies discussed herein are executable. In alternative embodiments, the machine 1100 operates as a standalone device or can be coupled (e.g., networked) to other machines. In a networked deployment, the machine 1100 operates in the capacity of a server machine or a client machine in a server-client network environment, or as a peer machine in a peer-to-peer (or distributed) network environment. Examples of the machine 1100 are a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1116, sequentially or otherwise, that specify actions to be taken by the machine 1100. Further, while only a single machine 1100 is illustrated, the term "machine" also includes a collection of machines 1100 that individually or jointly execute the instructions 1116 to perform any one or more of the methodologies discussed herein.

In various embodiments, the machine 1100 comprises processors 1110, memory 1130, and I/O components 1150, which are configurable to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1112 and a processor 1114 that are able to execute the instructions 1116. In one embodiment, the term "processor" includes multiple processors 1110 that comprise two or more independent processors 1112, 1114 (also referred to as "cores") that are able to execute the instructions 1116 contemporaneously. Although FIG. 11 shows multiple processors 1110, in another embodiment the machine 1100 includes a single processor 1112 with a single core, a single processor 1112 with multiple cores (e.g., a multi-core processor 1112), multiple processors 1110 with a single core, multiple processors 1110 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are examples of machine-readable media 1138.

As used herein, the term "memory" refers to a machine-readable medium 1138 able to store data volatilely or non-volatilely and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" includes a single medium or multiple media (e.g., a centralized or distributed database, or associated caches and servers) storing the instructions 1116. The term "machine-readable medium" also includes any medium, or combination of multiple media, that is capable of storing instructions (e.g., instructions 1116) for execution by a machine (e.g., machine 1100), such that the instructions, when executed by one or more processors of the machine (e.g., processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" includes, but is not limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152, input components 1154, and biometric components 1156. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. In various embodiments, EDA outputs are used to generate updates and changes to a circuit design, and once a final closure of timing with all associated timing thresholds and design requirements are met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or a circuit that results from the operations described herein.

Communication is implementable using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. One example embodiment causes a networking device such as the machine 1100 to transmit instructions that, when executed by one or more processors, cause the one or more processors to perform operations.

For example, one operation performs, in the multi-layer neural network, a convolutional change with a first plurality of convolutional filters connected in a first neural network layer of the multi-layer neural network. Another operation balances a complexity and a correct classification rate of the multi-layer neural network thereby to optimize the neural network.

In further examples, the communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a USB).

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 1138 is non-transitory (in other words, not having any transitory signals) in that it does not embody a propagating signal. However, labeling the machine-readable medium 1138 "non-transitory" should not be construed to mean that the machine-readable medium 1138 is incapable of movement; the machine-readable medium 1138 should be considered as being transportable from one physical location to another. Additionally, since the machine-readable medium 1138 is tangible, the machine-readable medium 1138 is a machine-readable device.

Example Operations

FIG. 12 is an example method 1200 of transmitting instructions that cause a processor to perform operations. Operation 1210 causes a networking device to transmit instructions that, when executed by one or more processors, cause the one or more processors to perform operations. An example is shown in FIG. 11 with the machine 1100 transmitting instructions to the network 1180.

FIG. 13 is an example 1300 of operations performed by transmitted instructions. Operation 1310 performs, in the multi-layer neural network, a convolutional change with a first plurality of convolutional filters connected in a first neural network layer of the multi-layer neural network. Operation 1320 balances a complexity and a correct classification rate of the multi-layer neural network thereby to optimize the neural network. Examples are shown in FIGS. 5 and 7.

FIG. 14 is an example 1400 of operations performed by transmitted instructions. Operation 1410 performs, in the multi-layer neural network, a connection change with a first plurality of convolutional filters connected in a first neural network layer of the multi-layer neural network. Operation 1420 balances a complexity and a correct classification rate of the multi-layer neural network thereby to optimize the neural network. Examples are shown in FIGS. 6 and 7.

FIG. 15 is an example 1500 of operations performed by transmitted instructions. Operation 1510 performs, in the multi-layer neural network in a computing device, a first convolution operation on a first plurality of input feature maps with a first plurality of convolutional filters, the first plurality of convolutional filters including a first set of one or more convolutional filters and a second set of one or more convolutional filters, the first plurality of convolutional filters having a plurality of filter precisions including a first filter precision and a second filter precision, the second filter precision being less than the first filter precision. An example is shown in FIG. 3.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense. The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method of optimizing a multi-layer neural network, the method comprising:
   causing a networking device to transmit instructions that, when executed by one or more processors, cause the one or more processors to perform operations comprising:
      generating a modified version of the multi-layer neural network by performing, in the multi-layer neural network, a convolutional change with a first plurality of convolutional filters connected in a first neural network layer of the multi-layer neural network, the multi-layer neural network comprising a plurality of network layers, each network layer comprising a plurality of parallel network paths between an input of the network layer and a concatenator within the network layer, at least first one of the plurality of parallel network paths including a bypass and a second one of the plurality of parallel network paths including one or more convolutional filters; and
      determining, for the modified version of the multi-layer neural network, a balance between a complexity and a correct classification rate of the multi-layer neural network to optimize the multi-layer neural network.

2. The method of claim 1, wherein the convolutional change is a change in a number of convolutional filters in the first plurality of convolutional filters in the first neural network layer in the multi-layer neural network.

3. The method of claim 1, wherein the convolutional change is a change in at least one of a height dimension and a width dimension of the first plurality of convolutional filters in the first neural network layer in the multi-layer neural network.

4. The method of claim 1, wherein the convolutional change is a change in a number of input feature maps in the first neural network layer in the multi-layer neural network.

5. The method of claim 1, wherein the convolutional change is a change in a number of output feature maps in the first neural network layer in the multi-layer neural network.

6. The method of claim 1, wherein the complexity is a number of multiply-and-accumulate operations in the multi-layer neural network.

7. The method of claim 1, wherein the complexity is a number of processor cycles consumed by the multi-layer neural network.

8. The method of claim 1, wherein the correct classification rate is modeled with at least an exponential function of a multivariate polynomial.

9. The method of claim 1, further comprising iteratively performing the convolutional change and balancing until the multi-layer neural network is optimized.

10. The method of claim 1, wherein the at least first one of the plurality of parallel network paths includes a plurality of convolutional filters and the plurality of convolutional filters have different filter parameters, the convolutional change changing the different filter parameters of the plurality of convolutional filters.

11. The method of claim 1, executed in a processor-implemented design automation module to modify an integrated circuit design by optimizing the multi-layer neural network implemented in the integrated circuit design.

12. The method of claim 1, wherein the correct classification rate is measured with a matrix factorization approach that comprises constructing a matrix from coefficients of a convolutional filter of the modified version of the multi-layer neural network.

13. A non-transitory computer-readable storage medium embodying instructions optimizing a multi-layer neural network that, when executed by one or more processors, cause the one or more processors to perform operations comprising:
   generating a modified version of the multi-layer neural network by performing, in the multi-layer neural network, a convolutional change with a first plurality of convolutional filters connected in a first neural network layer of the multi-layer neural network, the multi-layer neural network comprising a plurality of network layers, each network layer comprising a plurality of parallel network paths between an input of the network layer and a concatenator within the network layer, at least first one of the plurality of parallel network paths including a bypass and a second one of the plurality of parallel network paths including one or more convolutional filters; and
   determining, for the modified version of the multi-layer neural network, a balance between a complexity and a correct classification rate of the multi-layer neural network thereby to optimize the multi-layer neural network.

14. The non-transitory computer-readable storage medium of claim 13, wherein the convolutional change is a change in a number of convolutional filters in the first plurality of convolutional filters in the first neural network layer in the multi-layer neural network.

15. The non-transitory computer-readable storage medium of claim 13, wherein the convolutional change is a change in at least one of a height dimension and a width dimension of the first plurality of convolutional filters in the first neural network layer in the multi-layer neural network.

16. The non-transitory computer-readable storage medium of claim 13, wherein the convolutional change is a change in at least one of a first number of input feature maps and a second number of output feature maps in the first neural network layer in the multi-layer neural network.

17. A computing device comprising:
   a memory;
   one or more hardware processors coupled to the memory; and
   a processor-implemented design automation module configured to optimizing a multi-layer neural network with operations comprising:
      generating a modified version of the multi-layer neural network by performing, in the multi-layer neural network, a convolutional change with a first plurality of convolutional filters connected in a first neural network layer of the multi-layer neural network, the multi-layer neural network comprising a plurality of network layers, each network layer comprising a plurality of parallel network paths between an input of the network layer and a concatenator within the network layer, at least first one of the plurality of parallel network paths including a bypass and a second one of the plurality of parallel network paths including one or more convolutional filters; and
      determining, for the modified version of the multi-layer neural network, a balance between a complexity and a correct classification rate of the multi-layer neural network to optimize the multi-layer neural network.

18. The computing device of claim 17, wherein the convolutional change is a change in a number of convolutional filters in the first plurality of convolutional filters in the first neural network layer in the multi-layer neural network.

19. The computing device of claim 17, wherein the convolutional change is a change in at least one of a height dimension and a width dimension of the first plurality of convolutional filters in the first neural network layer in the multi-layer neural network.

20. The computing device of claim 17, wherein the convolutional change is a change in at least one of a first number of input feature maps and a second number of output feature maps in a first neural network layer in the multi-layer neural network.

* * * * *